United States Patent [19]
Groppe

[11] 3,743,149
[45] July 3, 1973

[54] GLASS CUTTING TABLE

[76] Inventor: Arthur D. Groppe, 1627 Starlite Dr., Milpitas, Calif. 94035

[22] Filed: Apr. 20, 1972

[21] Appl. No.: 245,988

[52] U.S. Cl. .................................. 225/2, 225/96.5
[51] Int. Cl. ............................................. B26f 3/00
[58] Field of Search ...................... 225/2, 96.5, 103, 225/93

[56] References Cited
UNITED STATES PATENTS
3,543,978  12/1970  Feillet ........................... 225/96.5 X
3,668,955  6/1972   Rupprecht et al. ............. 225/96.5 X

*Primary Examiner*—Frank T. Yost
*Attorney*—Manfred M. Warren et al.

[57] ABSTRACT

A glass cutting table provides a supporting surface for large glass sheets for scoring and cutting into smaller sections; means for raising the sheet from the table surface while maintaining the sheet in coplanar position to permit insertion of a break bar below the sheet in registration with a scored line thereon; such means functioning thereafter to lower the sheet onto the break bar to cause clean breaking of the sheet along the scored line.

8 Claims, 6 Drawing Figures

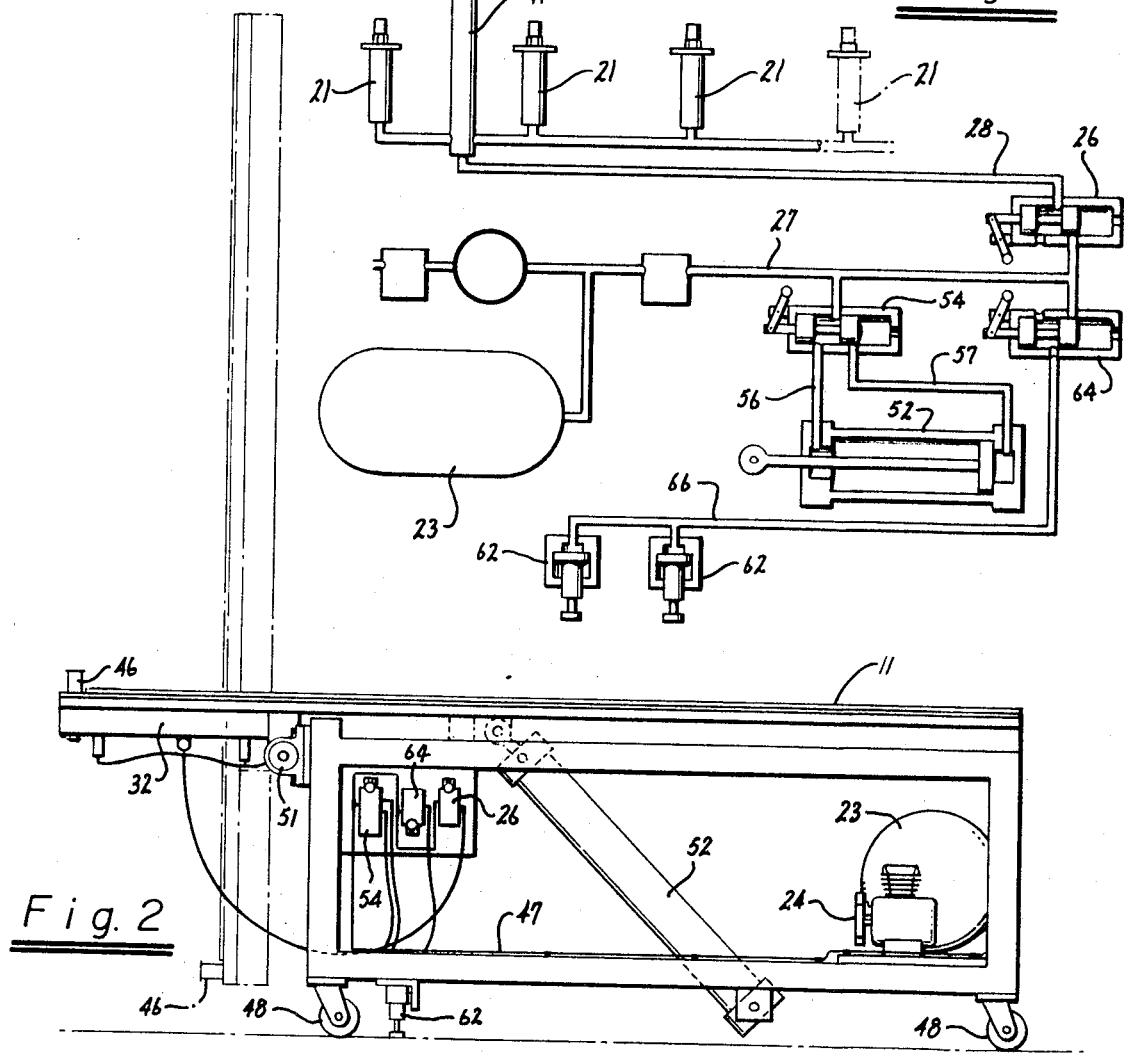
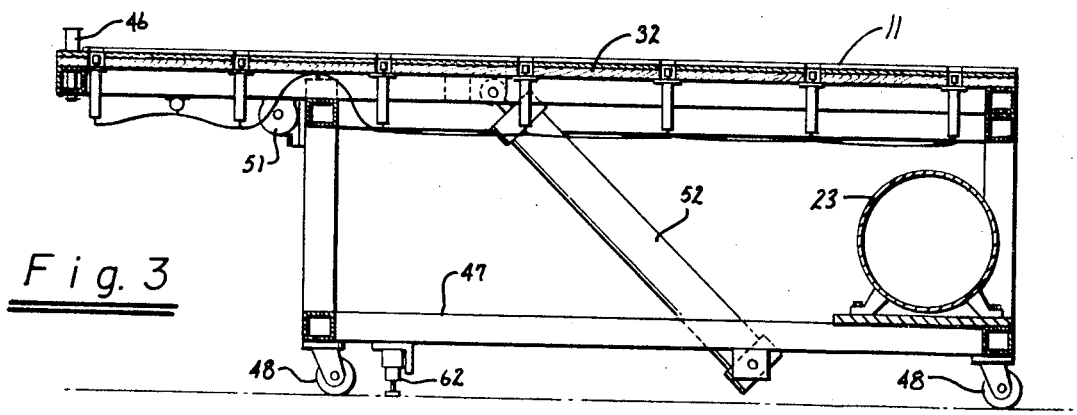

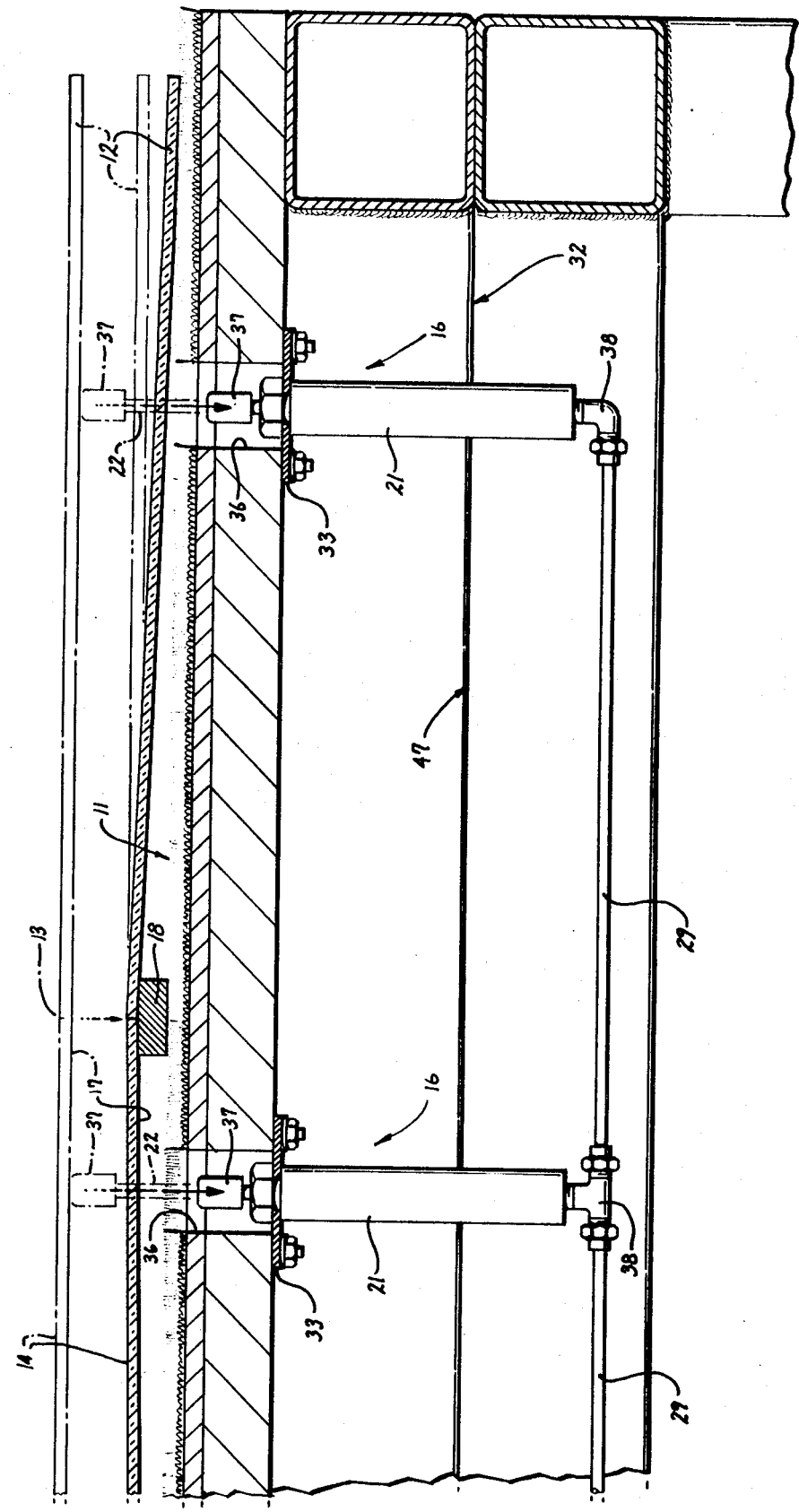

GLASS CUTTING TABLE

The invention relates to apparatus and methods for scoring and cracking of glass sheets into smaller sections.

Glass cutting tables are used for the supporting and cutting of relatively large glass sheets. These tables provide a large, flat, horizontal surface, usually covered with carpet, for supporting a glass sheet in position for scoring on its top surface by workmen using a diamond or other suitable glass cutter. Workmen will inscribe a scored cutting line across the sheet using a straight edge support for a guide, and then frequently slide the sheet on the table to position the scored line over a corner or edge of the table top, following which carefully applied downward pressure on the overhanging section of the glass sheet will cause the sheet to part, i.e. break, along the weakened plane defined by the scored line. Some skill and experience is required to ensure the desired clean break along the scored line and not otherwise. Another technique commonly used is to raise the glass sheet on the table after scoring the sheet and insert a break bar under the sheet in registration with the scored line. The overhanging, unsupported portions of the sheet extending away from the break bar will by their downward levering action produce sufficient strain to cause parting of the sheet along the scored line. Raising of a large glass sheet for insertion of the break bar also requires skill and experience and usually several workmen in order to prevent accidental breakage, and lowering of the sheet onto the break bar also needs be done with care to obtain simultaneous and uniform stressing of the sheet along the scored line. To avoid some of the foregoing problems, cutting tables have been designed with built-in break bars which are power elevated from the glass supporting surface. In such case, the workman scores the sheet, then slides the sheet across the table top to place the scored line in registration with the break bar, and then actuates the control for raising the break bar to sever the sheet along the scored line. In many instances, the placement of the scored line on the glass sheet will cause large portions of the sheet to overhang the table when the sheet is positioned to register the scored line with the break bar, and thus require workmen to be present and to exercise skill and experience in the handling and support of the overhanging glass sheet.

The glass cutting table of the present invention avoids the several problems above enumerated and provides for the full, safe and continuous support of the glass sheet during all of the steps of the glass cutting operation. It enables one operator to quickly and easily handle and cut large glass sheets with minimum accidental glass breakage, thereby effecting substantial savings in both labor and material.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the Claims.

REFERRING TO SAID DRAWINGS:

FIG. 2 is a side elevation of the table.

FIG. 3 is a cross-sectional view.

FIG. 5 is a diagrammatic representation of the pneumatic system used with the present table.

FIG. 6 is a side elevation of the table and a glass sheet thereon illustrating the method of the present invention.

Figure 1:
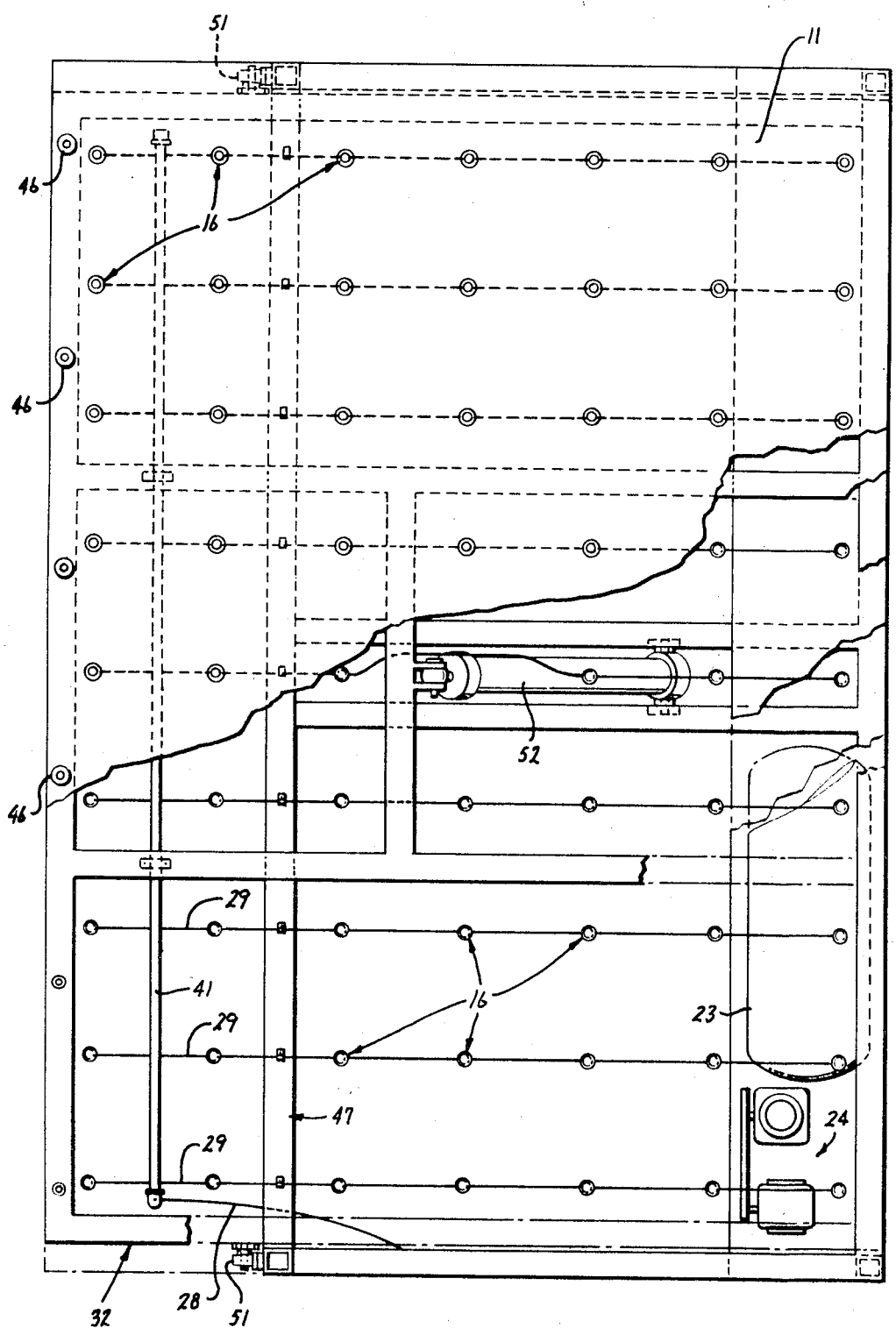
FIG. 1 is a plan view of a glass cutting table constructed in accordance with the present invention, with portions broken away to show underlying structure.

The glass cutting table of the present invention provides a supporting surface 11 for a sheet 12 of glass having a scored line 13 on its upper surface 14 defining a cut to be made; and means 16 carried by the table for engagement with the underside 17 of the glass for raising the sheet to an elevated position with respect to the table for insertion of a break bar in the space provided under the elevated glass sheet and with the break bar aligned with scored line 17; means 16 being characterized in providing support for sheet 12 during raising thereof to its elevated position and while in elevated position and for providing a uniform spacing of the sheet over break bar 18 and a uniform lowering of the sheet onto the break bar to provide simultaneous engagement of the sheet with the bar along the full length of the scored line, thus ensuring a uniformly applied stress to the glass sheet and an assured and proper cracking of the sheet along the scored line.

Figure 4:
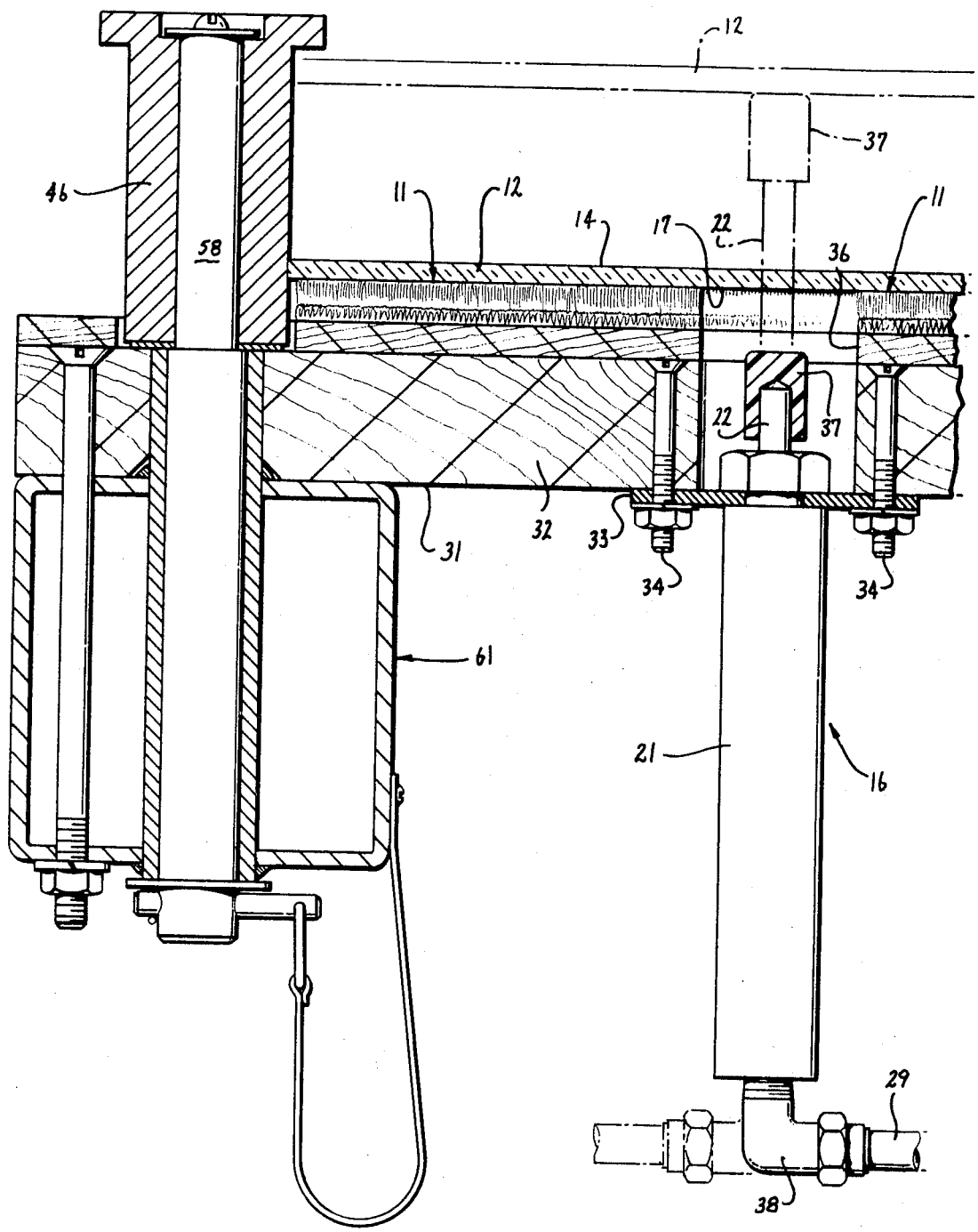
FIG. 4 is a fragmentary cross-sectional view of a portion of the table.

In order to obtain the above described precise and uniform handling of the glass sheet, and as a feature of the present invention, means 16 here comprises a plurality of fluid actuators, best seen in FIG. 4, which have a retracted position below surface 11 and an extended position above the surface corresponding with the elevated sheet position; and these actuators are energized and de-energized under manually controlled fluid pressure connected to the actuators in a manner providing uniform actuation thereof. Preferably, and as here shown, each of the actuators comprises a pneumatic cylinder 21 mounted with its axis normal to surface 11; a plunger 22 mounted for reciprocation in each of the cylinders and having an end adapted for engagement with the underside of the glass and being disposed below surface 11 in a retracted position of the plunger and above surface 11 in a pressure displaced position of the plunger corresponding with the desired sheet elevation; a source of air under pressure (tank 23 and motor compressor unit 24); a manually controlled valve 26 connected by conduit 27 to tank 23; and a plurality of conduits 28 and 29 connecting cylinders 21 in parallel with valve 26 for assuring uniformly applied pressure. Preferably, cylinders 21 are mounted in substantially equilaterally spaced relation to each other to provide a grid-like array over surface 11 and a multiplicity of rectilinear spaces for insertion of the break bar. Cylinders 21 may be mounted at the underside 31 of the table top section 32 as by means of mounting plates 33 and bolts 34, as seen in FIG. 4, and in coaxial alignment with openings 36 in the top section through which the upper ends of the plungers may move. Preferably, tip members 37 formed of soft compressible material are mounted on the plunger ends, as seen in FIG. 4, so as to provide non-marring engagement with the underside 17 of the glass sheet. Fittings 38 are connected to the opposite ends of the cylinders 21 for connection to the air supply conduits. Uniform application of pressure to the air cylinders is assisted by the provision of a main distributor manifold 41, see FIGS. 1 and 5, which is connected by supply conduit 28 and is in turn connected to a series of branch conduits 29, the system being designed and sized for obtaining uniform application of pneumatic pressure to all of the actuators.

As another feature of the present construction, the table top 32 may be oriented into a vertical plane, as illustrated in phantom line in FIG. 2, and is provided with a plurality of rollers 46 along its lower edge for receiving and supporting the bottom edge of a vertically disposed glass sheet which may be positioned upon and drawn over the rollers and into position on the table. Usually, the large glass sheets, as received from the glass manufacturers, will be stored by fabricators in a vertical disposition of the sheets to permit the most convenient withdrawal from stock. The base frame of the present table is fitted with caster wheels to permit movement of the table into position for receiving an uncut glass sheet out of stock. As will be observed from FIGS. 2 and 3, the table top section is secured to the base frame 47 by hinges 51 which permit the swinging of the top section 32 between horizontal and vertical positions, as seen in FIG. 2. Such displacement of the top is here effected by a pneumatic cylinder 52 connected between the base frame and top sections, as seen in FIGS. 1, 2 and 3. Control of cylinder 52 is effected by manual valve 54 connected to air supply conduit 27 and having conduit connections 56 and 57 to the opposite ends of air cylinder 52, see FIG. 5. When the table top is displaced to vertical position, as shown in phantom line in FIG. 2, for receiving a glass sheet, it will be noted that rollers 46 project from the normal glass supporting surface 11 and are journaled on pin shafts 58, see FIG. 4, for rotation about axes perpendicular to surface 11, thereby disposing the rollers in position for receiving and supporting the bottom edge of a vertically disposed glass sheet withdrawn from stock and positioned upon and drawn over the rollers. Shafts 58 are carried in a box-like frame 61 surrounding and forming part of the table top section, in the manner illustrated in FIG. 4. Rollers 46 also provide support for the sheet while the table top section is swung about hinges 51 to its horizontal position. The glass sheet may then be scored or the table moved on its caster wheels 48 to a more convenient position in the shop. Anchoring of the table against movement during the glass loading or glass sheet cutting operation can be effected by a plurality of pneumatically operated feet 62 carried by base frame 47 and which may be pressure extended to floor engagement. These feet are here controlled by a manually operable valve 64 connected to the feet by conduit 66.

The glass sheet may be scored while supported on the table top in the usual fashion, as above explained, then elevated, a break bar inserted and the sheet lowered onto the break bar for severing of the sheet along the scored line, as above described. Where a skate cutter is used, the sheet may be scored when in an elevated position, thus saving one step and time in the glass cutting process.

I claim:

1. A glass cutting table providing a supporting surface for a sheet of glass having a scored line on its upper surface defining a cut to be made;

means carried by said table for engagement with the underside of said sheet for raising said sheet to an elevated position with respect to said table;

said means functioning to support said sheet in planar position during raising thereof to and when in elevated position;

said means in elevated position of said sheet providing space between said surface and underside of said sheet for positioning of a break bar on said surface, within said space and in registration with said scored line; and said means functioning to lower said sheet onto said break bar.

2. A glass cutting table as defined in claim 1, said means comprising:

a plurality of fluid actuators mounted on said table and having a retracted position below said surface and an extended position above said surface corresponding with said elevated sheet position; and manually controlled fluid pressure means connected to said actuators for providing uniform actuation thereof to extended position.

3. A glass cutting table as defined in claim 2, each of said actuators comprising a pneumatic cylinder mounted with its axis normal to said surface;

a plunger mounted for reciprocation in each of said cylinders and having an end adapted for engagement with the underside of said sheet and being disposed below said surface in a retracted position of said plunger and above said surface in a pressure displaced position of said plunger corresponding with said elevated sheet position;

a source of air under pressure;

a manually controlled valve connected to said source; and conduits connecting said cylinders in parallel to said valve.

4. A glass cutting table as defined in claim 3, said cylinders being mounted in substantially equilaterally spaced relation to each other to provide a grid-like array on said surface and rectilinear spaces for said break bar.

5. A glass cutting table as defined in claim 4, and tip members formed of compressible material mounted on said plunger ends for non-marring engagement with said sheet.

6. A glass cutting table as defined in claim 4, said table comprising:

a base;

a table top providing said glass top surface and hinged to said base for movement between a vertical glass sheet receiving position and a horizontal glass sheet supporting position, said cylinders being carried by said top; and a plurality of rollers mounted at the lower end of said top in vertical position, said rollers projecting from said surface and being journaled for rotation about axes perpendicular thereto and formed for receiving and supporting the bottom edge of a vertically disposed glass sheet positioned upon and drawn over said rollers, said rollers being formed to support said sheet during subsequent movement of said top to horizontal position.

7. A method of cutting a glass sheet having a scored line on its upper surface defining a cut to be made and comprising:

supporting said sheet in planar position in spaced relation over a supporting surface;
positioning a break bar on said surface and under said sheet and in registration with said scored line; and
lowering said sheet onto said break bar.

8. A method as defined in claim 7:
initially supporting said sheet on said supporting surface;
scoring said sheet while in supporting position on said surface;
elevating said sheet from said supporting surface to provide space for said break bar; and
supporting said sheet in planar position during the elevation thereof.

* * * * *